(12) United States Patent
Stevens et al.

(10) Patent No.: US 8,419,057 B2
(45) Date of Patent: Apr. 16, 2013

(54) GAS GENERATING SYSTEM

(75) Inventors: Bruce A. Stevens, Oakland, MI (US);
Donald B. Patterson, Smithfield, UT (US); Robert M. Krupp, Rochester, MI (US); David M. McCormick, St. Clair Shores, MI (US)

(73) Assignee: TK Holdings, Inc., Armada, MI (US)

( * ) Notice: Subject to any disclaimer, the term of this patent is extended or adjusted under 35 U.S.C. 154(b) by 0 days.

(21) Appl. No.: 12/896,625

(22) Filed: Oct. 1, 2010

(65) Prior Publication Data

US 2011/0049851 A1 Mar. 3, 2011

Related U.S. Application Data

(62) Division of application No. 11/820,337, filed on Jun. 19, 2007, now Pat. No. 7,806,436.

(60) Provisional application No. 60/814,967, filed on Jun. 19, 2006, provisional application No. 60/815,205, filed on Jun. 19, 2006, provisional application No. 60/819,442, filed on Jul. 7, 2006, provisional application No. 60/831,034, filed on Jul. 14, 2006.

(51) Int. Cl.
*B60R 21/26* (2006.01)
*B60R 21/272* (2006.01)

(52) U.S. Cl.
USPC ............................ 280/741; 280/737; 102/530

(58) Field of Classification Search .................. 280/736, 280/737, 738, 740, 741, 742; 102/530, 531
See application file for complete search history.

(56) References Cited

U.S. PATENT DOCUMENTS

| | | | | |
|---|---|---|---|---|
| 3,721,456 A | * | 3/1973 | McDonald | 280/736 |
| 3,731,843 A | | 5/1973 | Anderson, Jr. | 222/3 |
| 3,895,821 A | * | 7/1975 | Schotthoefer et al. | 280/737 |
| 4,021,058 A | | 5/1977 | Suzuki et al. | 280/737 |
| 4,200,615 A | * | 4/1980 | Hamilton et al. | 422/166 |
| 5,031,932 A | | 7/1991 | Frantom et al. | 280/741 |
| 5,242,194 A | | 9/1993 | Popek | 280/737 |
| 5,280,951 A | | 1/1994 | Rizzi et al. | 280/736 |
| 5,411,290 A | * | 5/1995 | Chan et al. | 280/737 |
| 5,602,361 A | | 2/1997 | Hamilton et al. | 102/288 |
| 5,626,360 A | * | 5/1997 | Lauritzen et al. | 280/741 |
| 5,655,790 A | * | 8/1997 | Faigle et al. | 280/737 |
| 5,709,406 A | * | 1/1998 | Buchanan | 280/737 |
| 5,711,546 A | * | 1/1998 | Hamilton et al. | 280/736 |
| 5,788,275 A | | 8/1998 | Butt et al. | 280/737 |
| 6,068,292 A | | 5/2000 | Renz | 280/737 |
| 6,095,556 A | | 8/2000 | Bailey et al. | 280/737 |
| 6,170,867 B1 | * | 1/2001 | Rink et al. | 280/736 |
| 6,234,522 B1 | | 5/2001 | Albrecht et al. | 280/737 |
| 6,234,523 B1 | | 5/2001 | Tokoro et al. | 280/737 |
| 6,244,623 B1 | | 6/2001 | Moore et al. | 280/737 |
| 6,332,404 B1 | | 12/2001 | Rink et al. | 102/530 |

(Continued)

*Primary Examiner* — Faye M Fleming
*Assistant Examiner* — Barry Gooden, Jr.
(74) *Attorney, Agent, or Firm* — L.C. Begin & Associates, PLLC

(57) ABSTRACT

A gas generating system includes a first enclosure containing a gas, and a second enclosure having a gas generant material contained therein. The second enclosure is operatively coupled to the first enclosure so as to enable fluid communication between the first enclosure and the second enclosure. After activation of the gas generating system, the gas in the first enclosure passes through the second enclosure prior to exiting the system.

17 Claims, 5 Drawing Sheets

U.S. PATENT DOCUMENTS

| | | | |
|---|---|---|---|
| 6,488,310 B1 | 12/2002 | Ryobo et al. | 280/736 |
| 6,553,914 B2 * | 4/2003 | Hosey et al. | 102/530 |
| 6,786,507 B2 | 9/2004 | Dolling et al. | 280/737 |
| 7,040,657 B2 | 5/2006 | Iwai et al. | 280/737 |
| 7,044,501 B2 | 5/2006 | Yamazaki | 280/741 |
| 7,431,335 B2 * | 10/2008 | Khandhadia et al. | 280/737 |
| 7,806,436 B2 | 10/2010 | Stevens et al. | 280/741 |
| 2002/0053789 A1 | 5/2002 | Fujimoto et al. | 280/741 |
| 2002/0073873 A1 * | 6/2002 | Bley et al. | 102/530 |
| 2002/0145275 A1 * | 10/2002 | Hosey et al. | 280/741 |
| 2002/0190510 A1 | 12/2002 | Yamazaki | 280/736 |
| 2003/0001370 A1 | 1/2003 | Ryobo et al. | 280/741 |
| 2004/0084884 A1 | 5/2004 | Yamazaki et al. | 280/741 |
| 2005/0035580 A1 | 2/2005 | Inman et al. | |
| 2005/0082805 A1 | 4/2005 | Blackburn | 280/737 |
| 2005/0110253 A1 | 5/2005 | Khandhadia et al. | 280/736 |
| 2005/0236821 A1 | 10/2005 | Hofmann et al. | 280/737 |
| 2006/0279075 A1 * | 12/2006 | McCormick | 280/736 |
| 2007/0085311 A1 | 4/2007 | Hofmann et al. | 280/739 |
| 2008/0061541 A1 * | 3/2008 | Yano | 280/741 |

* cited by examiner

GAS GENERATING SYSTEM

CROSS-REFERENCE TO RELATED APPLICATIONS

This application is a divisional of prior U.S. application Ser. No. 11/820,337, filed Jun. 19, 2007 now U.S. Pat. No. 7,806,436, which claims the benefit of U.S. Provisional Application Ser. Nos. 60/814,967 and 60/815,205 filed on Jun. 19, 2006; 60/819,442 filed on Jul. 7, 2006; and 60/831,034 filed on Jul. 14, 2006. All of the above-mentioned applications are incorporated herein by reference.

BACKGROUND OF THE INVENTION

The present invention relates to gas generating systems and, more particularly, to a pyrotechnic gas generating system containing stored gas for inflating an inflatable vehicle occupant restraint device, such as an air bag.

It is known to use gas generating systems incorporating a stored gas (or "hybrid") inflator to inflate an inflatable vehicle occupant restraint, such as an air bag, to restrain and protect a vehicle occupant in the event of a collision. One issue with gas generating systems for inflating airbags is the provision of sufficient gas to keep the bag inflated over an extended period of time. In some existing gas generator designs, after a relatively rapid initial generation of gases and inflation of the airbag to a desired volume and pressure, gases may leak or vent from the airbag, thus maintaining sufficient bag inflation for only a relatively short time period. However, some applications require that the airbag be maintained in a sufficiently inflated state for a relatively longer time period.

In addition, it is desirable to generate and distribute the inflation gases as efficiently as possible. However, in some designs, the relatively low temperatures at which the inflation gas is stored and deployed limit expansion of the stored gas, thereby reducing the efficiency of the gas generating system.

In addition, in some gas generating systems utilizing combustion of a gas generant as well as a release of stored gas, to provide inflation gases to an inflatable vehicle occupant restraint device, the gas generant and the stored gas are typically not in fluid communication prior to ignition of the gas generant. Thus, the gas generant is not exposed to the high pressures produced by the stored inflation gas. The relatively low pressure at which the gas generant is stored limits the selection of gas generants to compounds that burn efficiently at relatively low pressures. This precludes the use of alternative (possibly less expensive) gas generants that would burn efficiently at higher pressures.

SUMMARY OF THE INVENTION

In accordance with the present invention, a gas generating system is provided including a first enclosure containing a gas, and a second enclosure having a gas generant material contained therein. The second enclosure is operatively coupled to the first enclosure so as to enable fluid communication between the first enclosure and the second enclosure. After activation of the gas generating system, the gas in the first enclosure passes through the second enclosure prior to exiting the system.

DETAILED DESCRIPTION

Figure 1:
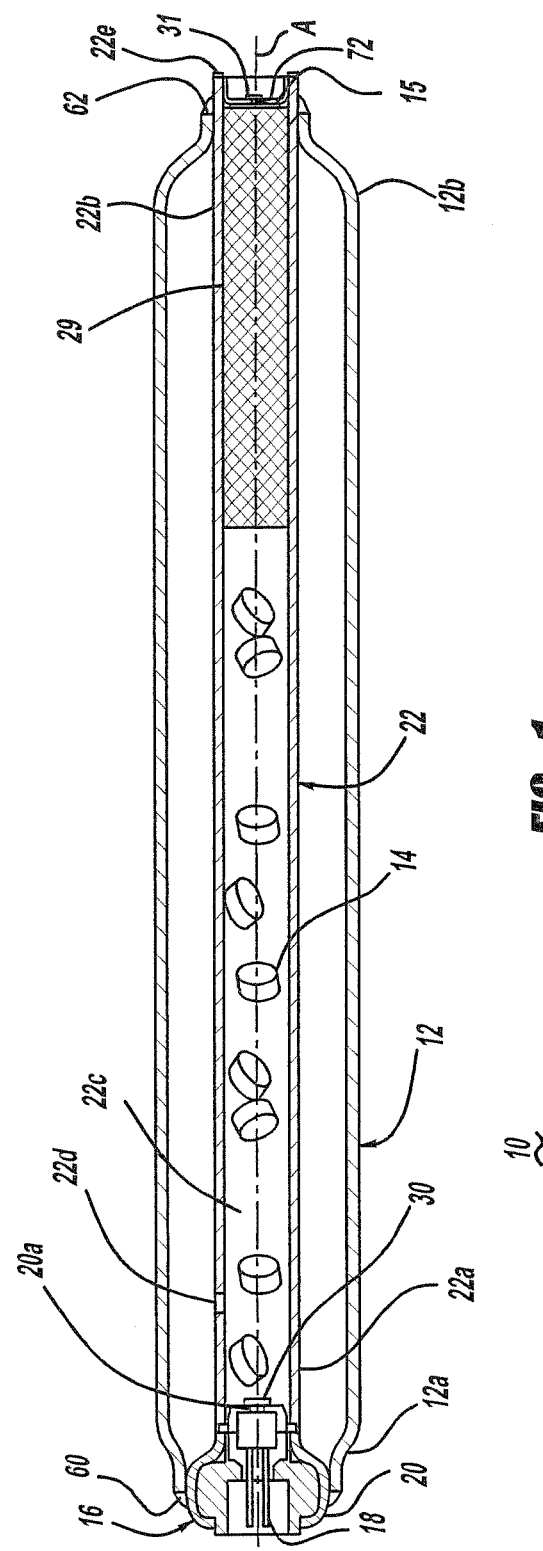
FIG. 1 is a cross-sectional side view of a gas generating system in accordance with a first embodiment of the present invention.

FIG. 1 shows a gas generating system 10 in accordance with a first embodiment of the present invention. The gas generating system generally includes a first enclosure containing a gas, and a second enclosure having a gas generant material contained therein. In the embodiment shown in the FIG. 1, the first enclosure is a pressure vessel 12, and the second enclosure is a gas generant enclosure 22 (described in greater detail below) for containing a gas generant material therein. In the embodiment shown, vessel 12 is an elongate, substantially cylindrical metallic body, such as is well known in the art. It should be appreciated, however, that alternative pressure vessel body types and designs may be used without departing from the scope of the present invention. Vessel 12 has a longitudinal central axis A, an opening 60 formed at a first end 12a of vessel 12, and an opening 62 formed at a second end 12b of the vessel. The pressure vessel may be extruded or otherwise metal formed and may be made from carbon steel or stainless steel, for example. Vessel 12 is filled with an inert gas.

An igniter 18 is secured to the pressure vessel so as to enable fluid communication with an interior of gas generant enclosure 22. In the embodiment shown, igniter 18 is incorporated into an igniter cap assembly 16 that includes an igniter 18 and an end cap 20. Igniter cap assembly 16 is positioned along central axis A to seal opening 60 provided in pressure vessel 12. End cap 20 includes an opening 20a formed therein to enable fluid communication between igniter 18 and the interior of enclosure 22 upon activation of the gas generating system. Igniter 18 may be formed as known in the art. One exemplary igniter construction is described in U.S. Pat. No. 6,009,809, herein incorporated by reference. Cap 20 may be stamped, extruded, cast, molded, or otherwise formed from carbon steel, stainless steel, a polymer material, or any other suitable material. Cap 20 is welded, clamped, or otherwise suitably secured to pressure vessel 12 in a manner sufficient to ensure a gas tight seal between cap 20 and vessel 12.

A rupturable, fluid-tight seal, such as a burst disk 30 is positioned to seal opening 20a in end cap 20. Disk 30 forms a fluid-tight barrier between the interior of end cap 20 and the interior of enclosure 22. Various disks, foils, films, etc. may be used to form burst disk 30. For example, disks made from materials and/or having structures which are relatively more or less readily ruptured may be used.

Referring again to FIG. 1, gas generant enclosure 22 is provided for containing a gas generant material 14 and for facilitating longitudinal propagation of gas generant combustion. Enclosure 22 is operatively coupled to pressure vessel 12 so as to enable fluid communication between enclosure 22 and pressure vessel 12. Enclosure 22 is elongate and substantially cylindrical and has a first end 22a, a second end 22b, and an interior 22c for containing gas generant 14 therein. In the embodiment shown in FIG. 1, enclosure 22 is defined by igniter cap assembly 16, a tube 23 extending along substantially the entire length of pressure vessel 12, and a cap 15 (described below) positioned at enclosure second end 22b to cover an open end of tube 23. However, alternative shapes and structures of the gas generant enclosure are also contemplated. Tube 23 may be fabricated by, for example, extruding or roll-forming the tube from sheet metal and then perforating the tube. In the embodiment shown in FIG. 1, tube 23 is a unitary tube. However, the use of a tube formed by combining multiple pieces is also contemplated.

Enclosure 22 also includes an orifice 22d formed therealong to enable fluid communication between the enclosure and the interior of vessel 12 external to enclosure 22, thereby enabling the passage of gas stored in vessel 12 into enclosure 22. In a particular embodiment, orifice 22d is a metering orifice that is sized to achieve a predetermined flow rate of stored gas into enclosure 22 upon activation of the gas generating system. In the embodiment shown in FIG. 1, orifice 22d is formed in tube 23. At least one orifice is also provided along the enclosure to enable fluid communication between the enclosure interior and an exterior of the gas generating system. In the embodiment shown in FIG. 1, this orifice is in the form of an opening 72 in cap 15 positioned over an opening 22e at and end of tube 23.

Enclosure 22 is positioned within vessel 12 to extend along central axis A of the pressure vessel. First end 22a is positioned to enable fluid communication between igniter 18 and enclosure 22. Enclosure second end 22b is positioned and secured to pressure vessel second end 12b so as to enable fluid communication between the enclosure and an exterior of the gas generating system upon failure of a rupturable member 31 (described in detail below) applied to opening 72 of cap 15 to form a gas tight seal.

Referring again to FIG. 1, gas generant material 14 is positioned in gas generant enclosure 22. In the embodiment shown in FIG. 1, gas generant 14 is in tablet or granular form. However, other forms or shapes of solid gas generant are also contemplated. It has been found that the gas generator embodiments described herein operate most favorably with a high gas-yield, low solids-producing gas generant composition, such as a "smokeless" gas generant composition. Such gas generant compositions are exemplified by, but not limited to, compositions and processes described in U.S. Pat. Nos. 6,210,505, and 5,872,329, each incorporated by reference herein. As used herein, the term "smokeless" should be generally understood to mean such propellants as are capable of combustion yielding at least about 85% gaseous products, and preferably about 90% gaseous products, based on a total product mass; and, as a corollary, no more than about 15% solid products and, preferably, about 10% solid products, based on a total product mass. U.S. Pat. No. 6,210,505 discloses various high nitrogen nonazide gas compositions comprising a nonmetal salt of triazole or tetrazole fuel, phase stabilized ammonium nitrate (PSAN) as a primary oxidizer, a metallic second oxidizer, and an inert component such as clay or mica. U.S. Pat. No. 5,872,329 discloses various high nitrogen nonazide gas compositions comprising an amine salt of triazole or tetrazole fuel, and phase stabilized ammonium nitrate (PSAN) as an oxidizer.

Because the solid gas generant 14 is contained within pressure vessel 12 and is in continuous fluid contact or communication (via orifice 22d) with the high pressure gas stored within the pressure vessel, optimum combustion conditions are immediately available upon ignition of the gas generant. Under these conditions, it is believed that solid gas generants that burn efficiently at ambient pressures will burn with increased speed at efficiency at the relatively high pressures within the pressure vessel. For this reason, these gas generants may be particularly suitable for achieving the rapid gas generant burn rates desired in the present invention.

It should be appreciated that the proportions of gas generant to stored gas within the gas generating system may be varied to achieve predetermined design and performance objectives. For example, inflation of a smaller airbag or an airbelt may require a relatively smaller quantity of inflation gas than required by a larger airbag. In this instance, the mass of the gas generant used may be lessened accordingly. Similarly, where a relatively greater quantity of inflation gas is desired, the mass of the gas generant used may be increased accordingly. Alternatively, both the quantity of stored gas and the quantity of gas generant may be adjusted to produce a desired quantity of inflation gas.

Referring again to FIG. 1, a filter 29 may be incorporated into the gas generating system for filtering particulates from gases generated by combustion of gas generant 14. In general, filter 29 is positioned along a fluid flow path extending between the gas generant 14 and gas exit orifice 72 formed in gas generant enclosure 22. The filter may be positioned within gas generant combustion enclosure 22. For example, in the embodiment shown in FIG. 1, filter 29 is positioned in enclosure 22 adjacent gas generant material 14. The filter may be formed from any of a variety of materials (for example, a carbon fiber mesh or sheet) known in the art for filtering gas generant combustion products.

Referring to FIG. 1, cap 15 is positioned at enclosure second end 22b to cover an open end of tube 23. Cap 15 has one or more orifices 72 formed therein to enable fluid communication between the interior of enclosure 22 and an exterior of the gas generating system. Cap 15 may be stamped, cast, molded, or otherwise formed from carbon steel, stainless steel, a polymer, or any other suitable material. Cap 15 may be secured over enclosure second end 22b using any suitable method, for example welding or adhesive bonding.

A rupturable, fluid-tight seal, such as a burst disk 31 is positioned to seal opening(s) 72 in cap 15. Disk 31 forms a fluid-tight barrier between the interior of enclosure 22 and the exterior of the gas generant system. Various disks, foils, films, etc. may be used to form burst disk 31. For example, disks made from materials and/or having structures which are relatively more or less readily ruptured may be used.

Pressure vessel 12 may be pressurized and sealed using any one of several methods known in the art. One exemplary method of pressurizing and sealing vessel 12 is described in U.S. Pat. No. 6,488,310, which is incorporated herein by reference. Using this method, pressure vessel 12 is charged from a small hole formed in a boss (not shown) formed in one end of the pressure vessel. The hole is then closed using a seal pin or other suitable means.

Operation of the gas generating system shown in FIG. 1 will now be discussed. Upon receipt of a signal from a crash sensor, an electrical activation signal is sent to igniter 18, thereby activating the igniter. Combustion products from the igniter rupture burst disk 30 and ignite gas generant 14.

Enclosure 22 thus forms a combustion chamber for combustion of gas generant 14. Ignition of gas generant 14 results in a relatively rapid generation of combustion gases in the interior of enclosure 22, increasing the internal pressure in enclosure 22. The increased pressure ruptures burst disk 31 at gas exit orifice 72, enabling the combustion products to pass through filter 29 and exit the gas generating system to inflate an associated inflatable element (for example, an inflatable element of a vehicle occupant protection system.)

As the gas generant is consumed, combustion chamber pressure drops, enabling gas stored in vessel 12 to enter enclosure 22 through orifice 22d. The stored gas flows through the heated combustion chamber 22c and filter 29, absorbing heat from the combustion chamber and filter and expanding on its way out through gas exit orifice 72 into the inflatable element of the vehicle occupant protection system.

Because the solid gas generant is contained within the high pressure gas pressure vessel and is in continuous fluid contact or communication with the high pressure gas, optimum conditions exist for combustion of the gas generant immediately upon ignition. Thus, a relatively faster burning rate and temperature of gas generant 14 will result than would otherwise ordinarily take place. The high burn rate and temperature of the gas generant typically produce a shock wave and a rapid increase in the pressure of the stored gas, rupturing burst disk 31. Accordingly, the amount of time required from activation of the gas generating system 10 until gas is released and available for inflation of an inflatable device is minimized. Also, as the gas generant is positioned within the pressure vessel and is exposed to the relatively high stored inflation gas pressure, the use of gas generants that burn more efficiently at higher pressures is enabled. In addition, the present invention obviates the need for a separate, sealed combustion chamber for the gas generant. This reduces manufacturing complexity and cost of the gas generating system. Also, flow of the stored gas through the metering orifice provides a flow of gas into the inflatable device over a relatively extended time period, thereby enabling the airbag to remain inflated for a longer period. In addition, as the stored gas flows through the hot combustion chamber and filter prior to discharge into the inflatable device, the stored gas is heated by mixing with the combustion gases and also by convection during contact with enclosure 22 and filter 29. Expansion of the stored gas is thus enhanced, increasing the efficiency of the gas generating system. Also, the generation of undesirable effluents during gas generant combustion is reduced, due the high temperature and pressure of gas generant ignition and combustion. Finally, there is no requirement for a seal or burst disk covering the orifice 22d on gas generant enclosure 22.

Figure 2:
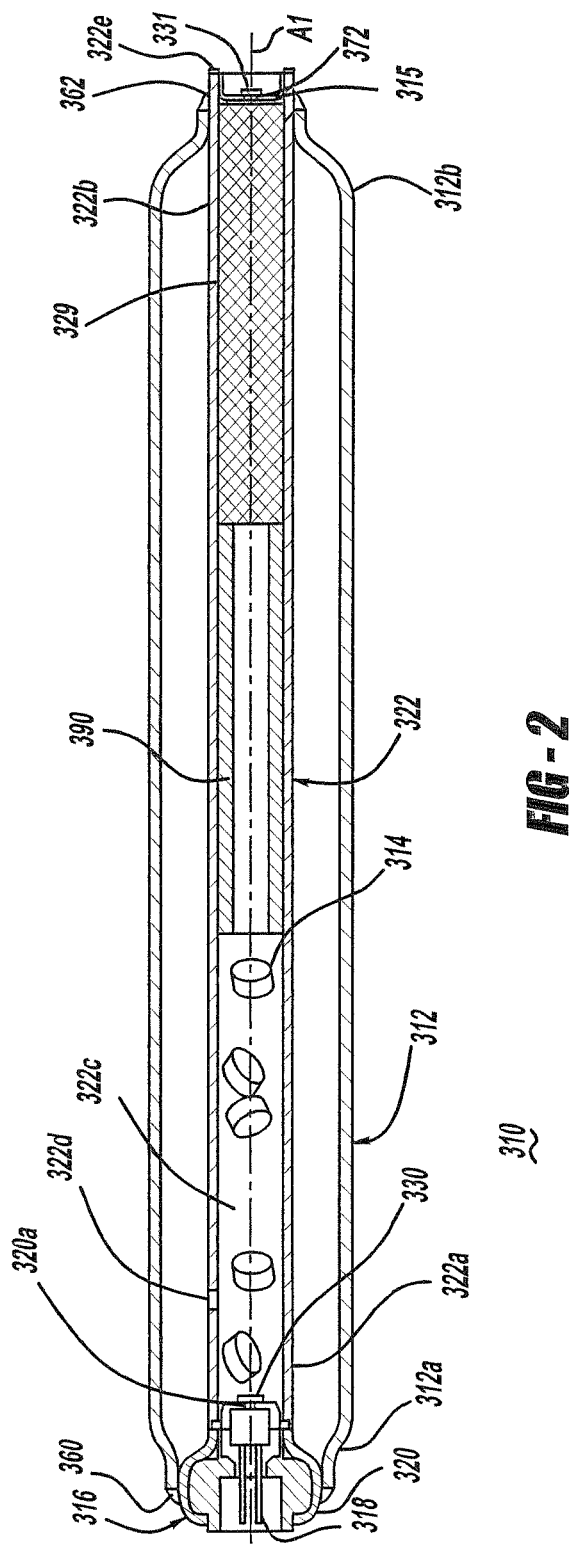
FIG. 2 is a cross-sectional side view of a gas generating system in accordance with a second embodiment of the present invention.

FIG. 2 shows another embodiment 310 of a gas generating system gas generating system in accordance with the present invention. The embodiment shown in FIG. 2 is similar structurally and operationally to the embodiment shown in FIG. 1. Gas generating system 310 includes a first enclosure in the form of a pressure vessel 312. In the embodiment shown, vessel 312 is an elongate, substantially cylindrical metallic body, such as is well known in the art. It should be appreciated, however, that alternative vessel body types and designs may be used without departing from the scope of the present invention. Vessel 312 has a longitudinal central axis A1, an opening 360 formed at a first end 312a of vessel 312, and an opening 362 formed at a second end 312b of the vessel. The pressure vessel may be extruded or otherwise metal formed and may be made from carbon steel or stainless steel, for example. Vessel 312 is filled with an oxidizing gas, for example, nitrous oxide.

An igniter 318 is secured to the pressure vessel so as to enable fluid communication with an interior of a gas generant enclosure 322 (described below). In the embodiment shown, igniter 318 is incorporated into an igniter cap assembly 316 that includes an igniter 318 and an end cap 320. Igniter cap assembly 316 is positioned along central axis A to seal opening 360 provided in pressure vessel 312. End cap 320 includes an opening 320a formed therein to enable fluid communication between igniter 318 and the interior of enclosure 322 upon activation of the gas generating system. Igniter 318 may be formed as known in the art. One exemplary igniter construction is described in U.S. Pat. No. 6,009,809, herein incorporated by reference. Cap 320 may be stamped, extruded, cast, molded, or otherwise formed from carbon steel, stainless steel, a polymer material, or any other suitable material. Cap 320 is welded, clamped, or otherwise suitably secured to pressure vessel 312 in a manner sufficient to ensure a gas tight seal between cap 320 and vessel 312.

A rupturable, fluid-tight seal, such as a burst disk 330 is positioned to seal opening 320a in cap 320. Disk 330 forms a fluid-tight barrier between the interior of cap 320 and the interior of enclosure 322. Various disks, foils, films, etc. may be used to form burst disk 330. For example, disks made from materials and/or having structures which are relatively more or less readily ruptured may be used.

Referring again to FIG. 2, a gas generant enclosure 322 is provided for containing a gas generant material 314 and for facilitating longitudinal propagation of gas generant combustion. Enclosure 322 is operatively coupled to pressure vessel 312 so as to enable fluid communication between enclosure 322 and pressure vessel 312. Enclosure 322 is elongate and substantially cylindrical and has a first end 322a, a second end 322b, and an interior 322c for containing gas generant material 314 therein.

In the embodiment shown in FIG. 2, enclosure 322 is defined by igniter cap assembly 316, a tube 323 extending along substantially the entire length of pressure vessel 312, and a cap 315 (described below) positioned at enclosure second end 322b to cover an open end of tube 323. However, alternative shapes and structures of the gas generant enclosure are also contemplated. Tube 323 may be fabricated by, for example, extruding or roll-forming the tube from sheet metal and then perforating the tube. In the embodiment shown in FIG. 2, tube 323 is a unitary tube. However, the use of a tube formed by combining multiple pieces is also contemplated.

Enclosure 322 includes an orifice 322d formed therealong to enable fluid communication between the enclosure and the interior of vessel 312 external to enclosure 322, thereby enabling passage of gases stored in vessel 312 into enclosure 322. In a particular embodiment, orifice 322d is a metering orifice that is sized to achieve a predetermined flow rate of stored gas into enclosure 322 upon activation of the gas generating system. In the embodiment shown in FIG. 2, orifice 322d is formed in tube 323. An orifice is also provided along the enclosure to enable fluid communication between the enclosure interior and an exterior of the gas generating system. In the embodiment shown in FIG. 2, this orifice is in the form of an opening 372 in cap 315 positioned over an opening 322e at and end of tube 323. Enclosure 322 is positioned within vessel 312 to extend along central axis A1 of the pressure vessel. First end 322a is positioned to enable fluid communication between igniter 318 and enclosure 322. Enclosure second end 322b is positioned and secured to pressure vessel second end 312b so as to enable fluid communication between the enclosure and an exterior of the gas generating system upon failure of a rupturable member 331 (described in detail below) applied to an opening 372 of cap 315.

Referring again to FIG. 2, gas generant material 314 is positioned in gas generant enclosure 322. In the embodiment shown in FIG. 2, gas generating material 314 is in tablet or granular form. However, other forms or shapes of solid gas generant are also contemplated. It has been found that the gas generating system embodiments described herein operate most favorably with a high gas-yield, low solids-producing gas generant composition, such as a "smokeless" gas generant composition. Such gas generant compositions are exemplified by, but not limited to, compositions and processes described in U.S. Pat. Nos. 6,210,505, and 5,872,329, each incorporated by reference herein. As used herein, the term "smokeless" should be generally understood to mean such propellants as are capable of combustion yielding at least about 85% gaseous products, and preferably about 90% gaseous products, based on a total product mass; and, as a corollary, no more than about 15% solid products and, preferably, about 10% solid products, based on a total product mass. U.S. Pat. No. 6,210,505 discloses various high nitrogen nonazide gas compositions comprising a nonmetal salt of triazole or tetrazole fuel, phase stabilized ammonium nitrate (PSAN) as a primary oxidizer, a metallic second oxidizer, and an inert component such as clay or mica. U.S. Pat. No. 5,872,329 discloses various high nitrogen nonazide gas compositions comprising an amine salt of triazole or tetrazole fuel, and phase stabilized ammonium nitrate (PSAN) as an oxidizer.

Because the solid gas generant 314 is contained within pressure vessel 312 and is in continuous fluid contact or communication with the high pressure gas stored within the pressure vessel, optimum combustion conditions are immediately available upon ignition of the gas generant. Under these conditions, it is believed that solid gas generants that burn efficiently at ambient pressures will burn with increased speed at efficiency at the relatively high pressures within the pressure vessel. For this reason, these gas generants may be particularly suitable for achieving rapid gas generant burn rates in the present invention.

In the embodiment shown in FIG. 2, a second gas generant material is positioned within gas generant enclosure 322. In a particular embodiment, the second gas generant material is in the form of a known solid fuel grain 390 (for example a plastic composition, polymeric composition, or other solid fuel grain) positioned within enclosure 322 adjacent gas generant 314, along a fluid flow path extending between the first gas generant 314 and opening 372 formed in gas generant enclosure 322. Grain 390 has an annular structure to enable gases from combustion of gas generant 314 to flow therethrough to a filter 329 (described below) and out of the gas generating system via opening 372 to inflate an inflatable article. In addition, the annular structure of grain 390 permits substantially uniform heating of the grain by the combustion gases.

Fuel grain 390 may comprise any fuel made in a known manner. Suitable gas generant compositions are disclosed, for example, in Applicant's co-pending U.S. patent application Ser. No. 09/664,130, incorporated herein by reference. Also, other gas generants that should be incorporated by reference in the application include, but are not limited to, those described in U.S. Pat. Nos. 5,035,757, 6,210,505, and 5,872, 329, also incorporated herein by reference. In addition, other suitable forms of gas generant of fuel compositions are contemplated for inclusion into gas generant enclosure 322 along with gas generant material 314.

It should be appreciated that the proportions of gas generant to stored gas within the gas generating system may be varied to achieve predetermined design and performance objectives. For example, inflation of a smaller airbag or an airbelt may require a relatively smaller quantity of inflation gas than required by a larger airbag. In this instance, the mass of the gas generant used may be lessened accordingly. Similarly, where a relatively greater quantity of inflation gas is desired, the mass of the gas generant used may be increased accordingly. Alternatively, both the quantity of stored gas and the quantity of gas generant may be adjusted to produce a desired quantity of inflation gas.

A filter 329 may be incorporated into the gas generating system for filtering particulates from gases generated by combustion of gas generant 314. In general, filter 329 is positioned within gas generant enclosure 322 along a fluid flow path extending between the gas generant material 314 and gas exit orifice 372 formed in the gas generant enclosure. The filter may be positioned within gas generant enclosure 322. For example, in the embodiment shown in FIG. 2, filter 329 is positioned in enclosure 322 adjacent second gas generant material 390. The filter may be formed from any of a variety of materials (for example, a carbon fiber mesh or sheet) known in the art for filtering gas generant combustion products.

Referring to FIG. 2, cap 315 is positioned at enclosure second end 322b to cover an open end of tube 323. Cap has one or more orifices 372 formed therein to enable fluid communication between the interior of enclosure 322 and an exterior of the gas generating system. Cap 315 may be stamped, cast, molded, or otherwise formed and may be made from carbon steel, stainless steel, a polymer, or any other suitable material. Cap 315 may be secured over enclosure second end 22b using any suitable method, for example welding or adhesive bonding.

A rupturable, fluid-tight seal, such as a burst disk 331 is positioned to seal opening 372 in cap 315. Disk 331 forms a fluid-tight barrier between the interior of enclosure 322 and the exterior of the gas generant system. Various disks, foils, films, etc. may be used to form burst disk 331. For example, disks made from materials and/or having structures which are relatively more or less readily ruptured may be used.

Pressure vessel 312 may be pressurized and sealed using any one of several methods known in the art. One exemplary method of pressurizing and sealing vessel 312 is described in U.S. Pat. No. 6,488,310, which is incorporated herein by reference. Using this method, pressure vessel 312 is charged from a small hole formed in a boss (not shown) formed in one end of the pressure vessel. The hole is then closed using a seal pin or other suitable means.

Operation of the gas generating system shown in FIG. 2 will now be discussed. Upon receipt of a signal from a crash sensor, an electrical activation signal is sent to igniter 318, thereby activating the igniter. Combustion products from the igniter rupture burst disk 330 and ignite gas generant material 314. Enclosure 322 thus forms a combustion chamber for combustion of gas generant 314. Ignition of gas generant material 314 results in a relatively rapid generation of combustion gases in the interior of enclosure 322, increasing the internal pressure in enclosure 322. The increased pressure ruptures burst disk 331 at gas exit orifice 372, enabling the combustion products to pass through filter 329 and exit the gas generating system to inflate an associated inflatable element of, for example, a vehicle occupant protection system.

As the gas generant is consumed, combustion chamber pressure drops, enabling the stored oxidizer gas to enter enclosure 322 through orifice 322d. Heat from combustion of gas generant material 314 and the flow of oxidizing gas cause solid fuel grain 390 to combust. The stored gas flows through the heated combustion chamber 322c and filter 329, absorbing heat from the combustion chamber and filter and expanding on its way out through gas exit orifice 372 into the inflatable element of the vehicle occupant protection system. In addition to the combustion products of gas generant 314 and the stored oxidizer gas, the combustion products of solid fuel grain 390 also contribute gas to the inflation of the inflatable article. Combustion of the solid fuel grain continues until the grain is consumed or until the supply of oxidizer gas is depleted.

Because the solid gas generant 314 is contained within the high pressure gas pressure vessel and is in continuous fluid contact or communication with the high pressure gas, optimum conditions exist for combustion of the gas generant immediately upon ignition. Thus, a relatively faster burning rate and temperature of gas generant 314 will result than would otherwise ordinarily take place. The high burn rate and temperature of the gas generant material typically produce a shock wave and a rapid increase in the pressure of the stored gas, rupturing burst disk 331. Accordingly, the amount of time required from ignition/activation of gas generating system 310 until gas is released and available for inflation of an inflatable device is minimized. Also, as the gas generant is positioned within the pressure vessel and is exposed to the relatively high stored inflation gas pressure, the use of gas generants that burn more efficiently at higher pressures is enabled. In addition, the present invention obviates the need for a separate, sealed combustion chamber for the gas generant. This reduces manufacturing complexity and cost of the gas generating system. Also, flow of the stored gas through the metering orifice provides a flow of gas into the inflatable device over a relatively extended time period, thereby enabling the inflatable device to remain inflated for a longer period. In addition, as the stored gas flows through the hot combustion chamber and filter prior to discharge into the inflatable device, the stored gas is heated by mixing with the combustion gases and also by convection during contact with enclosure 322 and filter 329. Expansion of the stored gas is thus enhanced, increasing the efficiency of the gas generating system. Also, the generation of undesirable effluents during gas generant combustion is reduced, due the high temperature and pressure of gas generant ignition and combustion. In addition, there is no requirement for a seal or burst disk covering the orifice 322d on gas generant enclosure 322. Finally, as the stored gas is an oxidizer gas used to combust the solid fuel grain, overall, efficiency of the gas generation process is increased, and burning of the solid grain contributes additional gases to the inflatable device.

Figure 3:
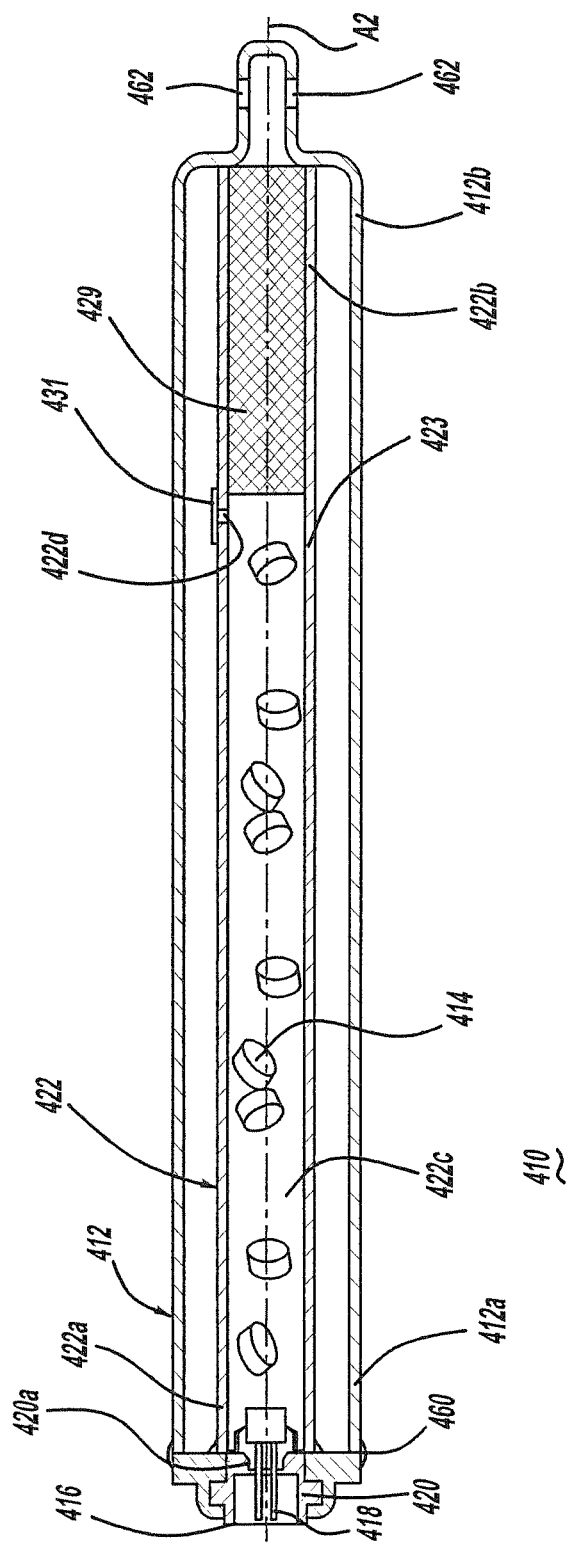
FIG. 3 is a cross-sectional side view of a gas generating system in accordance with a third embodiment of the present invention.
Figure 4A:
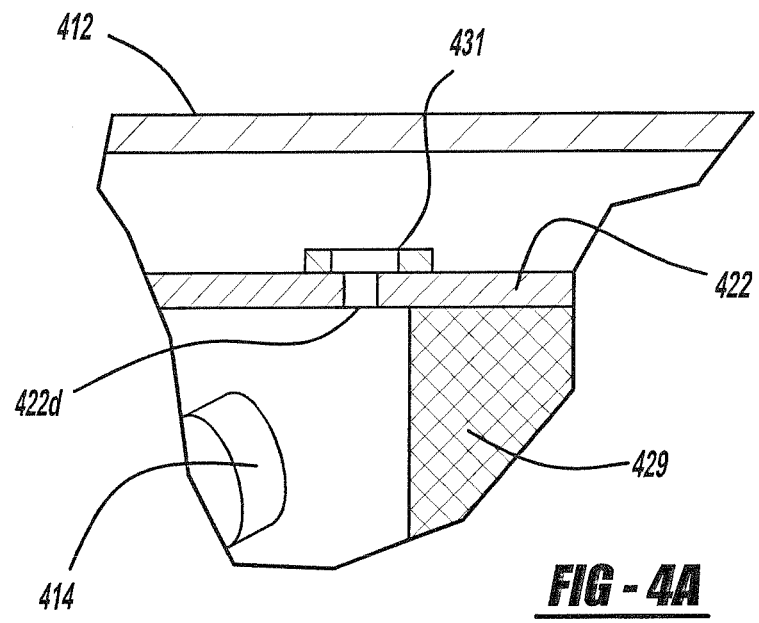
FIG. 4A is a cross-sectional view of a portion of the gas generating system shown in FIG. 3 illustrating a first gas generant enclosure sealing method.
Figure 4B:
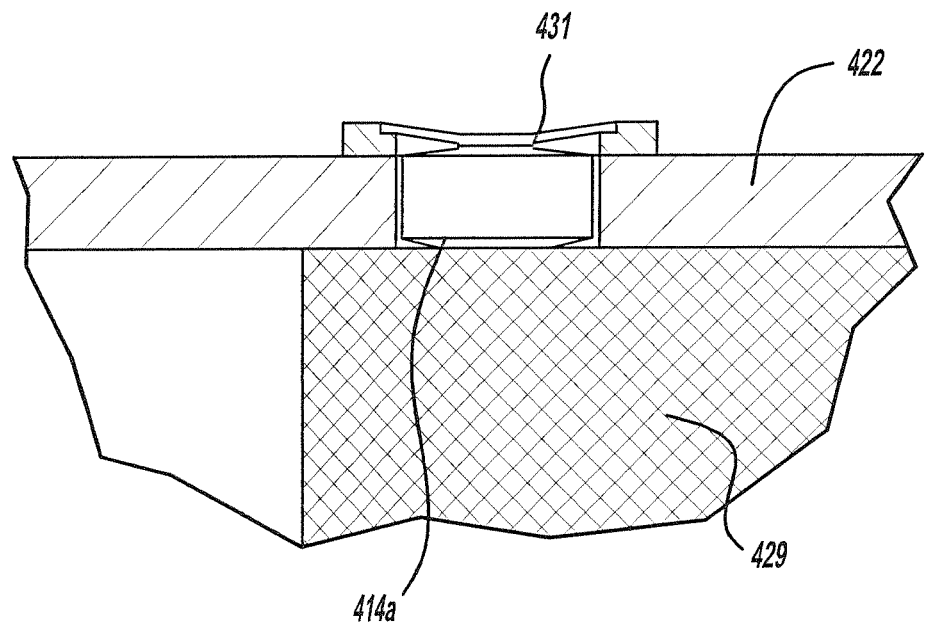
FIG. 4B is a cross-sectional view of a portion of the gas generating system shown in FIG. 3 illustrating a second gas generant enclosure sealing method.

FIGS. 3, 4, and 4A show yet another embodiment 410 of a gas generating system in accordance with the present invention. The embodiment shown in FIGS. 3, 4A, and 4B is similar structurally and operationally to the embodiments shown in FIGS. 1 and 2. Gas generating system 410 includes a first enclosure in the form of a pressure vessel 412. In the embodiment shown, vessel 412 is an elongate, substantially cylindrical metallic body, such as is well known in the art. It should be appreciated, however, that alternative vessel body types and designs may be used without departing from the scope of the present invention. Vessel 412 has a longitudinal central axis A2 and an opening 460 formed at a first end 412a of vessel 412. One or more gas exit orifices 462 are formed at a second end 412b of the vessel to enable fluid communication between an interior of vessel 412 and an exterior of the vessel. Orifices 462 may be formed integrally with vessel 412 during fabrication of the vessel, or the orifices may be incorporated into a separate piece which is attached to vessel 412. The pressure vessel may be extruded, roll-formed, or otherwise metal formed and may be made from carbon steel or stainless steel, for example. Holes 462 may be drilled, punched, or otherwise formed in the finished vessel.

An igniter 418 is secured to the pressure vessel so as to enable fluid communication with an interior of a gas generant enclosure 422 (described below). In the embodiment shown, igniter 418 is incorporated into an igniter cap assembly 416 that includes an igniter 418 and an end cap 420. Igniter cap assembly 416 is positioned along central axis A2 to seal opening 460 provided in pressure vessel 412. End cap 420 includes an opening 420a formed therein to enable fluid communication between igniter 418 and the interior of enclosure 422 upon activation of the gas generating system. Igniter 418 may be formed as known in the art. One exemplary igniter construction is described in U.S. Pat. No. 6,009,809, herein incorporated by reference. Cap 420 may be stamped, extruded, cast, molded, or otherwise formed from carbon steel, stainless steel, a polymer material, or any other suitable material. Cap 420 is welded, clamped, or otherwise suitably secured to pressure vessel 412 in a manner sufficient to ensure a gas tight seal between cap 420 and vessel 412.

Referring again to FIG. 3, gas generant enclosure 422 is provided for containing a gas generant material 414 and for facilitating longitudinal propagation of the gas generant combustion. Enclosure 422 is operatively coupled to pressure vessel 412 so as to enable fluid communication between enclosure 422 and pressure vessel 412. Enclosure 422 is elongate and substantially cylindrical and has a first end 422a, a second end 422b, and an interior 422c for containing gas generant 414 therein.

In the embodiment shown in FIG. 1, enclosure 422 is defined by igniter cap assembly 416, a tube 423 extending along substantially the entire length of pressure vessel 412, and a cap 415 (described below) positioned at enclosure second end 422b to cover an open end of tube 423. However, alternative shapes and structures of the gas generant enclosure are also contemplated. Tube 423 may be fabricated by, for example, extruding or roll-forming the tube from sheet metal and then perforating the tube. In the embodiment shown in FIG. 3, tube 423 is a unitary tube. However, the use of a tube formed by combining multiple pieces is also contemplated.

Enclosure 422 also includes an orifice 422d formed therealong to enable fluid communication between the enclosure and the interior of vessel 412 external to enclosure 422, thereby enabling passage of gases stored in vessel 412 into enclosure 422. In a particular embodiment, orifice 422d is a metering orifice that is sized Co achieve a predetermined flow rate of stored gas into enclosure 422 upon activation of the gas generating system. In the embodiment shown in FIG. 3, orifice 422d is formed in tube 423.

Enclosure 422 is positioned within vessel 412 to extend along central axis A2 of the pressure vessel. First end 422a is positioned to enable fluid communication between igniter 418 and enclosure 422. Enclosure second end 422b is positioned and secured to pressure vessel second end 412b so as to enable fluid communication between the enclosure and gas exit orifices 462 formed in vessel 412 upon activation of the gas generating system.

Referring again to FIG. 3, gas generant material 414 is positioned in gas generant enclosure 422. In the embodiment shown in FIG. 3, gas generant 414 is in tablet or granular form. However, other forms or shapes of solid gas generant are also contemplated. It has been found that the gas generator embodiments described herein operate most favorably with a high gas-yield, low solids-producing gas generant composition, such as a "smokeless" gas generant composition. Such gas generant compositions are exemplified by, but not limited to, compositions and processes described in U.S. Pat. Nos. 6,210,505, and 5,872,329, each incorporated by reference herein. As used herein, the term "smokeless" should be generally understood to mean such propellants as are capable of combustion yielding at least about 85% gaseous products, and preferably about 90% gaseous products, based on a total product mass; and, as a corollary, no more than about 15% solid products and, preferably, about 10% solid products, based on a total product mass. U.S. Pat. No. 6,210,505 discloses various high nitrogen nonazide gas compositions comprising a nonmetal salt of triazole or tetrazole fuel, phase stabilized ammonium nitrate (PSAN) as a primary oxidizer, a metallic second oxidizer, and an inert component such as clay or mica. U.S. Pat. No. 5,872,329 discloses various high nitrogen nonazide gas compositions comprising an amine salt of triazole or tetrazole fuel, and phase stabilized ammonium nitrate (PSAN) as an oxidizer.

It should be appreciated that the proportions of gas generant to stored gas within the gas generating system may be varied to achieve predetermined design and performance objectives. For example, inflation of a smaller airbag or an airbelt may require a relatively smaller quantity of inflation gas than required by a larger airbag. In this instance, the mass of the gas generant used may be lessened accordingly. Similarly, where a relatively greater quantity of inflation gas is desired, the mass of the gas generant used may be increased accordingly. Alternatively, both the quantity of stored gas and the quantity of gas generant may be adjusted to produce a desired quantity of inflation gas.

A filter 429 may be incorporated into the gas generating system for filtering particulates from gases generated by combustion of gas generant 414. In general, filter 429 is positioned in the second enclosure along a fluid flow path extending between the gas generant and gas exit orifices 462 formed in vessel 412. The filter may be positioned within gas generant combustion enclosure 422. For example, in the embodiment shown in FIG. 3, filter 429 is positioned in enclosure 422 adjacent gas generant material 414. The filter may be formed from any of a variety of materials (for example, a carbon fiber mesh or sheet) known in the art for filtering gas generant combustion products.

A fluid-tight seal, such as a burst disk 431 is positioned to seal opening 422*d* in enclosure 422. Disk 431 forms a fluid-tight barrier between the interior of enclosure 422 and the stored gas in vessel 412. Various disks, foils, films, etc. may be used to form burst disk 431. For example, rupturable disks made from materials and/or having structures which are relatively more or less readily ruptured may be used. Disk 431 may alternatively be formed from a polymeric material which is fusible in response to heat generated by combustion of gas generant 414. As used herein, the term "fusible" means capable of being fused or melted.

In a first particular embodiment (see FIG. 4A), during operation, heat from gas generant combustion softens the disk 431 to a point where gas pressure stresses the disk to failure, for example, during decompression of the combustion chamber. In another particular embodiment (see FIG. 4B), a gas generant pill 414*a* is positioned in orifice 422*d* under the disk 431 as a support member to support the disk against a pressure exerted by the stored gas in the first enclosure. During combustion of the gas generant, the pill 414*a* burns away, removing support from the disk and enabling failure of the disk. The support member or pill may alternatively be formed from a fusible material. Other disk failure modes are also contemplated.

Pressure vessel 412 may be pressurized and sealed using any one of several methods known in the art. One exemplary method of pressurizing and sealing vessel 412 is described in U.S. Pat. No. 6,488,310, which is incorporated herein by reference. Using this method, pressure vessel 412 is charged from a small hole formed in a boss (not shown) formed in one end of the pressure vessel. The hole is then closed using a seal pin or other suitable means.

Operation of the gas generating system shown in FIGS. 3, 4A, and 4B will now be discussed. Upon receipt of a signal from a crash sensor, an electrical activation signal is sent to igniter 418, thereby activating the igniter. Combustion products from the igniter ignite gas generant 414. Enclosure 422 thus forms a combustion chamber for combustion of gas generant 414. Ignition of gas generant 414 results in a relatively rapid generation of combustion gases in the enclosure 422, increasing the internal pressure in enclosure 422 and forcing the combustion products to pass through filter 429 and exit the gas generating system to inflate an associated inflatable element, for example, an airbag of a vehicle occupant protection system.

As stated previously, in a first particular embodiment (FIG. 4A), heat from gas generant combustion softens the disk 431 to a point where gas pressure stresses the disk to failure, for example, during decompression of the combustion chamber. In another particular embodiment (FIG. 4B), combustion of pill 414*a* burns the pill away, removing support from the disk and enabling failure of the disk.

As the combustion gases exit the combustion chamber, combustion chamber pressure drops, enabling the stored gas to enter the combustion chamber formed by enclosure 422 through orifice 422*d*. The stored gas then flows through the heated combustion chamber and filter 429, absorbing heat from the combustion chamber and filter and expanding on its way out through gas exit orifices 462 into the inflatable element of the vehicle occupant protection system. As the stored gas is used to maintain the inflatable device in an inflated condition over the long-term, burst disk 431 may be designed to rupture at substantially any time prior to completion of gas generant combustion.

Flow of the stored gas through orifice 422*d* provides a flow of gas into the inflatable device over a relatively extended time period, thereby enabling the airbag to remain inflated for a longer period. In addition, as the stored gas flows through the hot combustion chamber and filter prior to discharge into the airbag, the stored gas is heated by mixing with the combustion gases and also by convection during contact with enclosure 422 and filter 429. Expansion of the stored gas is thus enhanced, increasing the efficiency of the gas generating system.

Figure 5:
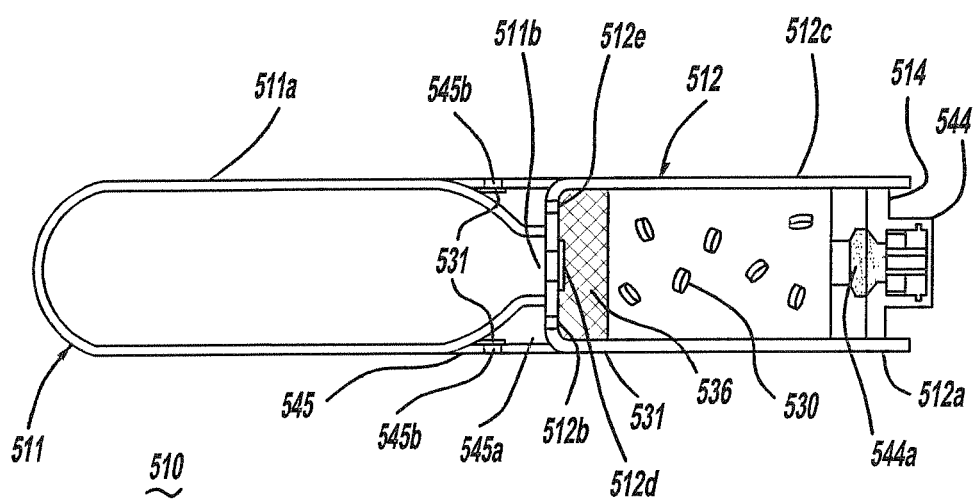
FIG. 5 is a cross-sectional view of a gas generating system in accordance with a fourth embodiment of the present invention.

FIG. 5 shows yet another embodiment of a gas generating system 510 in accordance with the present invention. Gas generating system 510 includes a first enclosure in the form of a gas bottle or tank 511 in which a pressurized fluid (in this case, an inflation gas) is stored. Bottle 511 has a wall 511*a* defining an opening 511*b* enabling fluid communication with an exterior of the bottle. Bottle 511 is made from a metal or metal alloy and may be a cast, drawn, or otherwise metal-formed. Bottle 511 may be filled with the pressurized fluid and sealed in a known manner.

Gas generating system 510 also includes a second enclosure in the form of a substantially cylindrical housing 512 positioned exterior of first enclosure 511 and having a pair of opposed ends 512*a*, 512*b* and a wall 512*c* extending between the ends to define a housing interior cavity. Housing 512 is made from a metal or metal alloy and may be a cast, drawn, extruded, or otherwise metal-formed. One or more openings 512d are provided in housing end 512b to enable fluid communication between an interior of the housing and bottle opening 511b. Thus, the interior of housing 512 and the contents thereof are exposed to, and under elevated pressure from, the pressurized gases stored in bottle 511. An edge of the bottle wall defining opening 511b abuts housing second end 512b and is secured to housing end 512b so as to provide a substantially fluid-tight seal at the junction between opening 511b and housing 512. One or more additional openings 512e are provided in housing end 512b to enable fluid communication between the interior of housing 512 and an exterior of the housing, enabling combustion gases to be fed into an enclosure 545a formed by a diffuser 545 (described in greater detail later) enclosing the junction between bottle 511 and housing 512.

Referring to FIG. 5, an end closure 514 is secured to end 512a of housing 512. End 512a of housing 512 may be crimped over portions of end closure 514 to secure the end closure in the housing, or other methods (for example, welding or adhesive attachment) may be used to secure end closure 514 to housing end 512a. If desired, a peripheral cavity (not shown) may be formed along end closure 514 for positioning an O-ring or seal (not shown) therein to seal the interface between end closure 514 and housing wall 512c. End closure 514 may be stamped, cast, molded, or otherwise formed and may be made from carbon steel, stainless steel, a polymer material, or any other suitable material.

Referring again to FIG. 5, an igniter assembly 544 is positioned and secured within end closure 514 so as to enable fluid communication between a gas generant 530 (described in greater detail below) positioned in housing 512 and an igniter 544a incorporated into the igniter assembly, for igniting the gas generant upon activation of the gas generating system. Igniter assembly 544 may be secured within end closure 514 using any one of several known methods, for example, by welding, crimping, using an interference fit, or by adhesive application. Igniter assemblies suitable for the application described herein may be obtained from any of a variety of known sources, for example Primex Technologies, Inc. of Redmond, Wash. or Aerospace Propulsion Products by, of The Netherlands. Igniter 544a may be formed as known in the art. Exemplary igniter constructions are described in U.S. Pat. Nos. 6,009,809 and 5,934,705, incorporated herein by reference. Igniter 544a may be secured within igniter assembly 544 by any one of a variety of methods, for instance using welds, adhesives, by crimping, or by integrally molding the igniter into a portion of the igniter assembly.

If desired, a quantity of an ignition compound (not shown) may be positioned proximate igniter 544a and gas generant 530. The ignition compound may be a known or suitable ignition or booster compound whose combustion ignites gas generant charge 530. One or more autoignition tablets (not shown) may also be placed proximate the igniter and the gas generant to facilitate ignition of the ignition compound and/or gas generant 530 upon external heating of the gas generator, in a manner well-known in the art.

Referring to FIG. 5, gas generant composition 530 is positioned within the interior cavity of housing 512. In the embodiment shown, gas generant 530 is in a granular form. However, it will be appreciated that other, alternative arrangements of the gas generant composition may be used. For example, a portion of the housing interior may be partially or completely filled with a gas generant in a wafer or tablet form. Gas generant 530 is also in fluid communication with the pressurized gas stored in bottle 511.

Because the solid gas generant 530 is in continuous fluid contact or communication with the high pressure gas stored within the pressure vessel, optimum combustion conditions are immediately available upon ignition of the gas generant. Under these conditions, it is believed that solid gas generants that burn efficiently at ambient pressures will burn with increased speed at efficiency at the relatively high pressures within the pressure vessel. For this reason, these gas generants may be particularly suitable for achieving rapid gas generant burn rates in the present invention. Suitable gas generant compositions are disclosed, for example, in Applicant's co-pending U.S. patent application Ser. No. 09/664,130, incorporated herein by reference. Also, other suitable gas generants incorporated by reference in the application include, but are not limited to, those described in U.S. Pat. Nos. 5,035,757, 6,210,505, and 5,872,329.

Referring to FIG. 5, a filter 536 is incorporated into the gas generator design for filtering particulates from gases generated by combustion of gas generant 530. In general, filter 536 is positioned within housing 512 between gas generant 530 and openings 512e formed along housing second end 512b so that any combustion products flowing toward openings 512e will be forced to pass through the filter. The filter is also positioned along a fluid flow path extending between bottle opening 511b and the openings 512e. The filter may be formed from any of a variety of materials (for example, a metal or carbon fiber mesh or sheet, or another, similar porous filter structure) known in the art for filtering gas generant combustion products.

A diffuser 545 forms a third enclosure surrounding the junction between bottle 511 and housing 512. Diffuser 545 may be stamped or otherwise formed from steel or other suitable materials, and then welded or otherwise fixed to bottle 511 and to housing second end 512b so as to form substantially gas-tight seals between the diffuser and bottle 511 and between the diffuser and housing 512. Diffuser 545 has one or more openings 545b formed therealong to enable fluid communication between enclosure 545a and an exterior of the gas generating system. Diffuser 545 functions to distribute gas flowing from enclosure 545a through openings 545b to an airbag or other inflatable device.

Rupturable, fluid-tight seals, such as burst disks 531 may be positioned to seal openings 545b in diffuser 545. Disks 531 form fluid-tight barriers between the interior of the diffuser and the exterior of the gas generating system. Various disks, foils, films, etc. may be used to form burst disks 531. The materials and structures of the membranes will depend on the desired performance characteristics of gas generating system 510. For example, disks made from materials and/or having structures which are relatively more or less readily ruptured may be used.

Operation of gas generating system 510 will now be discussed.

Upon a crash event, igniter 544a receives a signal from a crash sensor or accelerometer (not shown), for example, and then ignites gas generant 530. Thus, housing 512 serves as a combustion chamber for gas generant 530. Heat and combustion gases produced by ignition of gas generant 530 proceed through filter 536 to rupture burst disks 531. The gases then proceed through openings 512e and into enclosure 545. The gases then flow out of diffuser openings 545b.

As the gases produced by combustion of gas generant 530 flow out of housing 512, the pressure in housing 512 resulting from combustion of gas generant 530 begins to drop. As the housing internal pressure drops, pressurized gases stored in bottle 511 flow through bottle opening 511b, into housing second end opening 512d, through filter 536, and out of housing 512 and into enclosure 545 through openings 512e.

The previously stored gases then flow out of the gas generator through diffuser openings 545b.

Because the solid gas generant is contained within the high pressure gas pressure vessel and is in continuous fluid contact or communication with the high pressure gas, optimum conditions exist for combustion of the gas generant immediately upon ignition. Thus, a relatively faster burning rate and temperature of gas generant 530 will result than would otherwise ordinarily take place. Pressurization of the gas generant material with the cold stored inflation gas also enhances the stability of the gas generant material, and helps ensure more consistent ballistic performance of the gas generating system.

The high burn rate and temperature of the propellant typically produce a shock wave and a rapid increase in the pressure of the stored gas, rupturing burst disks 531. Accordingly, the amount of time from activation of gas generating system 510 until gas is released and available for inflation of an inflatable device is minimized. Thus, the design described herein provides a rapid initial inflation of the inflatable device. Also, flow of the stored gas through the metering orifice provides a flow of gas into the inflatable device over a relatively extended time period, thereby enabling the airbag to remain inflated for a longer period, thereby resulting in improved vehicle occupant protection system performance.

Also, as the gas generant is exposed to the relatively high stored inflation gas pressure, the use of gas generants that burn more efficiently at higher pressures is enabled. In addition, the present invention obviates the need for a separate, sealed combustion chamber for the gas generant. This reduces manufacturing complexity and cost of the gas generating system.

In addition, as the stored gas flows through the hot housing and filter prior to discharge into the airbag, the stored gas is heated by mixing with the combustion gases and also by convection during contact with housing 512 and filter 536. Expansion of the stored gas is thus enhanced, increasing the efficiency of the gas generating system for a given size of system. This enables the overall cost, mass, and size of the gas generating system to be reduced. Also, the generation of undesirable effluents during gas generant combustion is reduced, due the high temperature and pressure of gas generant ignition and combustion. Finally, there is no requirement for a seal or burst disk covering opening 511b between bottle 511 and housing 512.

Figure 6:
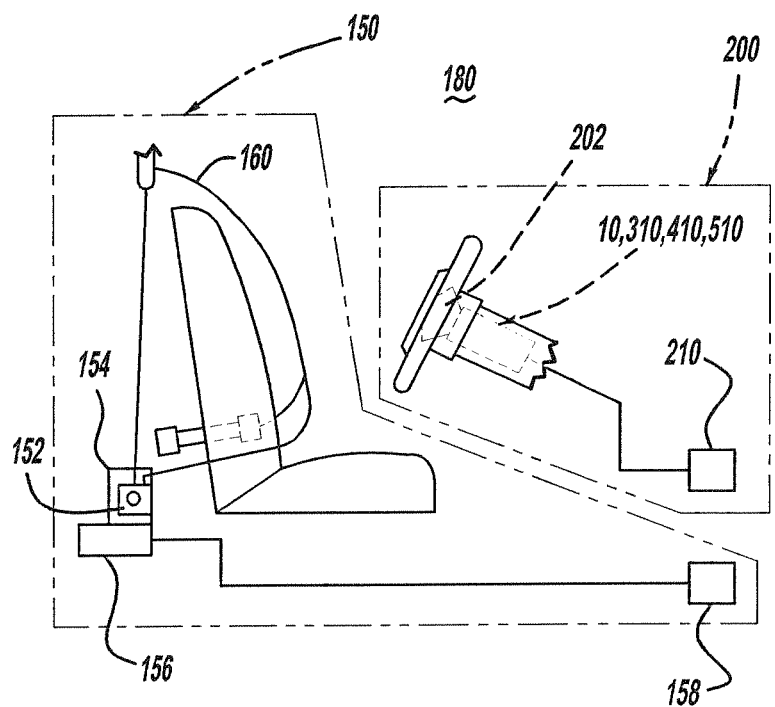
FIG. 6 is a schematic representation of an exemplary vehicle occupant protection system incorporating an embodiment of a gas generating system in accordance with the present invention.

Referring now to FIG. 6, in one possible application of any of the embodiments 10, 310, 410, 510 of the gas generating system described herein, the gas generating system is incorporated into an airbag system 200. Airbag system 200 includes at least one airbag 202 and a gas generating system 10, 310, 410, 510 as described herein and coupled to the airbag so as to enable fluid communication with an interior of the airbag upon activation of the gas generating system. Airbag system 200 may include (or be in operative communication with) a crash event sensor 210 that is in operative communication with a crash sensor algorithm (not shown) which signals activation of airbag system 200 via, for example, activation of an igniter (not shown in FIG. 6) in the event of a collision.

Referring again to FIG. 6, an embodiment of the gas generating system or an airbag system including an embodiment of the gas generating system may be also incorporated into a broader, more comprehensive vehicle occupant protection system 180 including additional elements such as a safety belt assembly 150. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 160 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Safety belt assembly 150 may include (or be in operative communication with) a crash event sensor 158 (for example, an inertia sensor or an accelerometer) that is in operative communication with a crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system comprising:
    a first enclosure having at least one gas exit opening formed therealong to enable fluid communication between an interior of the first enclosure and an exterior of the first enclosure;
    a gas generant enclosure positioned in the interior of the first enclosure, wherein the gas generant enclosure encloses the at least one gas exit opening so as to prevent a flow of gas from the interior of the first enclosure through the at least one gas exit opening prior to activation of the gas generating system
    wherein the gas generant enclosure includes a first opening enabling fluid communication between the gas generant enclosure and an interior portion of the first enclosure exterior of the gas generant enclosure, and wherein a seal is provided to prevent said fluid communication prior to activation of the gas generating system; and
    wherein the first opening is the only opening enabling fluid communication between the gas generant enclosure and the interior portion of the first enclosure exterior of the gas generant enclosure.

2. The gas generating system of claim 1 wherein the first opening is sized to achieve a predetermined flow rate of gas from the interior portion of the first enclosure into the gas generant enclosure after activation of the gas generating system.

3. The gas generating system of claim 1 further comprising a second opening in the gas generant enclosure enabling fluid communication with an exterior of the gas generating system; and
    a filter positioned in the gas generant enclosure along a fluid flow path extending between the gas generant and the second opening.

4. The gas generating system of claim 1 wherein the seal is configured to be melted by exposure to heat generated by combustion of a gas generant material contained in the gas generant enclosure.

5. A vehicle occupant protection system comprising the gas generating system in accordance with claim 1.

6. A gas generating system comprising:
a first enclosure having at least one gas exit opening formed therealong to enable fluid communication between an interior of the first enclosure and an exterior of the first enclosure;
a gas generant enclosure positioned in the interior of the first enclosure, wherein the gas generant enclosure encloses the at least one gas exit opening so as to prevent a flow of gas from the interior of the first enclosure through the at least one gas exit opening prior to activation of the gas generating system,
the gas generant enclosure including a first opening enabling fluid communication between the gas generant enclosure and an interior portion of the first enclosure exterior of the gas generant enclosure, and wherein a seal is provided to prevent said fluid communication prior to activation of the gas generating system;
a support member for supporting the seal against a pressure exerted by the gas in the first enclosure, so as to prevent failure of the seal; and
a filter positioned within the gas generant enclosure so as to support the support member.

7. The gas generating system of claim 6 wherein the support member is configured to melt when exposed to heat generated by combustion of the gas generant, such that melting of the seal under pressure from a pressurized gas produces failure of the support member.

8. A vehicle occupant protection system comprising the gas generating system in accordance with claim 6.

9. The gas generating system of claim 6 wherein the support member comprises combustible a gas generant material.

10. The gas generating system of claim 9 wherein the support member is configured to combust after activation of the gas generating system such that combustion of the support member removes support from the seal, thereby enabling failure of the seal.

11. The gas generating system of claim 9 wherein the support member is positioned within the first opening in the gas generant enclosure.

12. A gas generating system comprising:
a first enclosure;
a second enclosure coupled to the first enclosure;
a fluid-tight seal configured for preventing fluid communication between the first enclosure and the second enclosure prior to failure of the seal; and
a support member supporting the seal against a pressure exerted by a gas stored in the first enclosure, so as to prevent failure of the seal;
at least one opening formed in the second enclosure enabling fluid communication between an interior of the second enclosure and an interior of the first enclosure exterior of the second enclosure after failure of the seal, and wherein the support member is positioned in the at least one opening; and
a filter positioned within the second enclosure so as to support the support member.

13. The gas generating system of claim 12 wherein the support member is configured to combust after activation of the gas generating system such that combustion of the support member removes support from the seal, thereby enabling failure of the seal.

14. The gas generating system of claim 12 further comprising at least one opening formed in the second enclosure enabling fluid communication between an interior of the second enclosure and an interior of the first enclosure exterior of the second enclosure after failure of the seal, and wherein the support member is positioned in the at least one opening.

15. The gas generating system of claim 12 wherein the support member is formed from a combustible gas generant material.

16. The gas generating system of claim 12 wherein the support member is configured to melt when exposed to heat generated by combustion of the gas generant system, such that melting of the seal under pressure from a pressurized gas produces failure of the support member, thereby enabling failure of the seal.

17. A vehicle occupant protection system comprising a gas generating system in accordance with claim 12.

* * * * *

UNITED STATES PATENT AND TRADEMARK OFFICE
CERTIFICATE OF CORRECTION

PATENT NO. : 8,419,057 B2
APPLICATION NO. : 12/896625
DATED : April 16, 2013
INVENTOR(S) : Stevens et al.

It is certified that error appears in the above-identified patent and that said Letters Patent is hereby corrected as shown below:

In the Specifications:

Column 6, Line 61; Please delete "and" and insert --an--.

Column 10, Line 48; Please delete "CO" and insert --to--.

Column 13, Line 40; Please delete "by" and insert --bv--.

Signed and Sealed this
Twenty-fifth Day of June, 2013

Teresa Stanek Rea
*Acting Director of the United States Patent and Trademark Office*